(12) United States Patent
Roesler et al.

(10) Patent No.: US 10,375,106 B1
(45) Date of Patent: Aug. 6, 2019

(54) BACKPLANE FILTERING AND FIREWALLS

(71) Applicant: National Technology & Engineering Solutions of Sandia, LLC, Albuquerque, NM (US)

(72) Inventors: Alexander Roesler, Sandia Park, NM (US); Abraham Anthony Clements, Lafayette, IN (US); Jason Hamlet, Albuquerque, NM (US); John Mulder, Albuquerque, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 177 days.

(21) Appl. No.: 15/364,011

(22) Filed: Nov. 29, 2016

Related U.S. Application Data

(60) Provisional application No. 62/278,185, filed on Jan. 13, 2016.

(51) Int. Cl.
| | | |
|---|---|---|
| *G06F 21/70* | (2013.01) | |
| *G06F 21/71* | (2013.01) | |
| *G06F 21/82* | (2013.01) | |
| *G06F 21/83* | (2013.01) | |
| *G06F 21/84* | (2013.01) | |
| *G06F 21/85* | (2013.01) | |
| *H04L 29/06* | (2006.01) | |
| *G06N 20/00* | (2019.01) | |
| *G06F 21/57* | (2013.01) | |

(52) U.S. Cl.
CPC .......... *H04L 63/1441* (2013.01); *G06F 21/70* (2013.01); *G06F 21/71* (2013.01); *G06N 20/00* (2019.01); *H04L 63/0245* (2013.01); *H04L 63/1433* (2013.01); *G06F 21/57* (2013.01)

(58) Field of Classification Search
CPC .............. H04L 63/1416; H04L 63/145; H04L 63/1491; H04L 63/1441; H04L 63/0245; H04L 63/1433; G06F 21/554; G06F 21/56; G06F 21/566; G06F 21/70; G06F 21/71; G06F 21/57; G06N 20/00
See application file for complete search history.

(56) References Cited

U.S. PATENT DOCUMENTS 5,204,864 A * 4/1993 Won ...................... G06F 11/221
714/43
5,379,415 A * 1/1995 Papenberg ............ G06F 11/106
714/5.11

(Continued)

*Primary Examiner* — Theodore C Parsons
*Assistant Examiner* — Howard H. Louie
(74) *Attorney, Agent, or Firm* — Medley, Behrens & Lewis, LLC

(57) ABSTRACT

Described herein are various technologies for providing active mitigation of cyber-attacks against industrial and other control systems. A filtering device is connected to a backplane of a control system and receives communications from various modules of the control system. The filter device analyzes the received communications and determines whether they are genuine and permissible communications for the control system. Validated signals are output to a communications bus of the control system by the filter device, while impermissible communications are blocked. The filter device can be interposed between the modules of the control system and the backplane, or the filter device can be included as a component of a control system backplane.

20 Claims, 4 Drawing Sheets

(56) References Cited

U.S. PATENT DOCUMENTS

| | | | |
|---|---|---|---|
| 5,408,405 A * | 4/1995 | Mozumder | G05B 21/02 700/121 |
| 5,835,688 A * | 11/1998 | Fromherz | G05B 19/0426 358/1.13 |
| 5,862,086 A * | 1/1999 | Makimura | G11C 29/785 365/189.07 |
| 5,862,907 A * | 1/1999 | Taylor | B65G 47/261 198/781.05 |
| 6,037,857 A | 3/2000 | Behrens et al. | |
| 6,909,923 B2 | 6/2005 | Vasko et al. | |
| 6,975,966 B2 | 12/2005 | Scott et al. | |
| 7,058,693 B1 * | 6/2006 | Baker, Jr. | H04L 67/025 700/17 |
| 7,237,109 B2 | 6/2007 | Scott et al. | |
| 7,389,407 B1 * | 6/2008 | Kuslak | G06F 9/3836 712/232 |
| 7,853,677 B2 * | 12/2010 | Callaghan | H04L 63/08 709/223 |
| 7,870,299 B1 | 1/2011 | Sorensen et al. | |
| 8,683,592 B1 * | 3/2014 | Dotan | H04L 63/1408 709/224 |
| 8,903,593 B1 * | 12/2014 | Addepalli | H04W 4/046 701/29.1 |
| 9,032,522 B1 | 5/2015 | Mulder et al. | |
| 9,887,887 B2 * | 2/2018 | Hunter | H04W 4/21 |
| 2003/0226014 A1 * | 12/2003 | Schmidt | G06F 21/57 713/164 |
| 2008/0163337 A1 * | 7/2008 | Tuliani | H04L 63/0245 726/2 |
| 2008/0209505 A1 * | 8/2008 | Ghai | G06F 21/55 726/1 |
| 2010/0109721 A1 * | 5/2010 | Fuller | G06F 1/24 327/142 |
| 2011/0295649 A1 * | 12/2011 | Fine | G06Q 30/0201 705/7.29 |
| 2013/0233723 A1 * | 9/2013 | Morelle | C25B 1/245 205/619 |
| 2014/0109182 A1 * | 4/2014 | Smith | H04L 63/1416 726/3 |
| 2016/0021127 A1 * | 1/2016 | Yan | G06F 21/554 726/23 |
| 2016/0267413 A1 * | 9/2016 | Liang | G06F 21/552 |
| 2016/0381080 A1 * | 12/2016 | Reddem | H04L 63/0884 726/1 |
| 2017/0024660 A1 * | 1/2017 | Chen | G06N 99/005 |

* cited by examiner

BACKPLANE FILTERING AND FIREWALLS

RELATED APPLICATION

This application claims priority to U.S. Provisional Patent Application No. 62/278,185, filed on Jan. 13, 2016, and entitled "BACKPLANE FILTERING AND FIREWALLS", the entirety of which is incorporated herein by reference.

STATEMENT OF GOVERNMENTAL INTEREST

This invention was developed under Contract DE-AC04-94AL85000 between Sandia Corporation and the U.S. Department of Energy. The U.S. Government has certain rights in this invention.

BACKGROUND

Control systems currently face disruption from cyber-attacks as well as physical interference. Resilience of a control system to random and physical failures is usually achieved by implementing redundancy in the system such that a failure of a single component does not compromise operation of the system. Typically, redundant components of the system are identical. In the case of random or physical failures, an assumption that only a subset of devices will be affected generally holds. When the system faces cyber-attacks from intelligent adversaries, however, identical redundancy may be insufficient to maintain trustworthy operation of the system since cyber-attacks can be launched against many systems simultaneously. Conventional approaches to maintaining resilience of control systems cannot fully protect potentially critical control systems from cyber-attacks.

SUMMARY

The following is a brief summary of subject matter that is described in greater detail herein. This summary is not intended to be limiting as to the scope of the claims.

Described herein are various technologies pertaining to active mitigation of cyber-attacks against control systems. A logic device can be incorporated between modules of a control system and the control system's backplane, such that the logic device receives communications output by the modules prior to passing them to a backplane communications bus. The logic device determines whether a communication, or signal, is a permissible communication for the system that can safely be passed to the communications bus based upon various factors indicative of trustworthiness of the communication. For example, the logic device can determine whether to allow a communication to pass to the backplane communications bus based upon the communication's origin, its intended destination, content of the communication, an effect of the communication on operation of a physical system controlled by the control system, etc.

In addition to filtering potentially harmful communications on a control system bus, the logic device can take further corrective action such as isolating a compromised input/output module from the communications bus. The logic device can also assume various operations of a control system's processing unit if the logic device detects that the processing unit may have been compromised by an attack. The logic device can execute all or portions of control logic of the control system's processing unit, or the logic device can execute a model of the processing unit's logic in order to emulate the processing unit's functions. These operations, in conjunction with the filtering functions described above, allow the logic device to actively counter cyber-attacks by providing diverse redundancy in the control system. This diverse redundancy provided by the logic device can prevent a single simultaneous attack from subverting the entirety of the control system.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
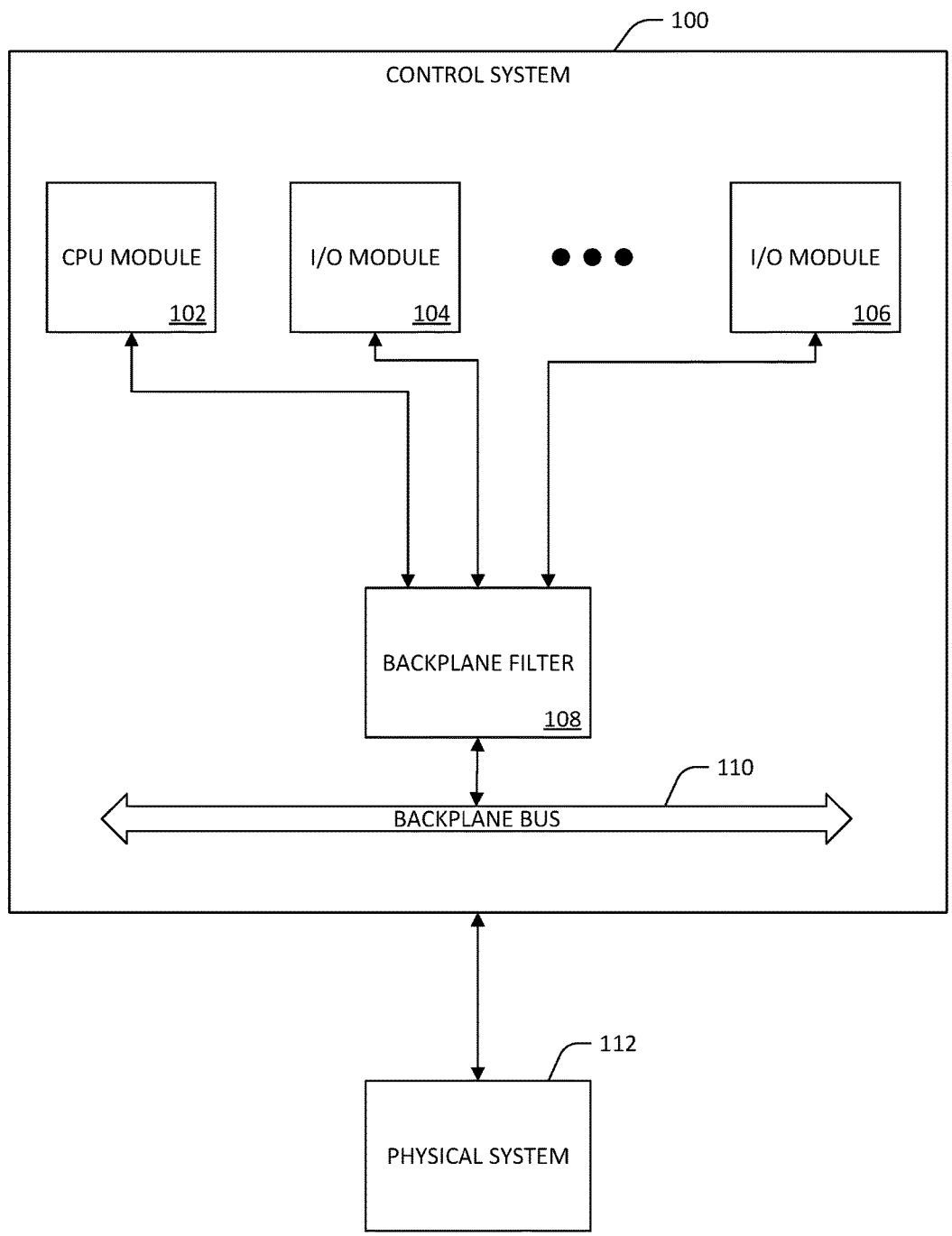
FIG. 1 is a functional block diagram of an exemplary control system that incorporates active cyber-attack mitigation by way of a backplane communications filter and firewall.

Various technologies pertaining to active mitigation of cyber-attacks of sensitive control systems are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

With reference to FIG. 1, an exemplary control system 100 that incorporates active cyber-attack mitigation is illustrated. The system 100 includes a CPU or processing module 102, and a plurality of n input/output (IO) modules 104-106. The modules 102-106 of the control system 100 communicate various signals (e.g., control signals, data signals, address signals, etc.) to a backplane filter 108 between the modules 102-106 and a backplane communications bus 110.

The signals communicated to the backplane filter 108 by the modules 102-106 are signals that are intended by the modules 102-106 to be directed to another module or modules in the modules 102-106. For example, a signal communicated by the CPU module 102 to the backplane filter 108 can be a control signal intended by the CPU module 102 to be communicated to the IO module 104 (e.g., a signal that directs the IO module 104 to read data from a particular source). The backplane filter 108 analyzes signals received from the modules 102-106 and determines, based upon various rules defining permissible operation of the control system 100, whether the received signals are permissible or impermissible signals for the system 100. Responsive to identifying that a received signal is a permissible signal for the system 100, the backplane filter 108 can output the signal to the backplane bus 110, whereupon it is received by the modules 102-106.

While the backplane filter 108 is described above as being a module interposed between the backplane communications bus 110 and the modules 102-106 of the control system 100, it is to be understood that a backplane of the control system 100 can comprise the backplane filter 108. Thus, the backplane filter can be a separate module that can be installed to interpose between the modules 102-106 and the backplane, or the backplane filter can be a component of a backplane of the control system 100. Furthermore, it is to be understood that while the backplane filter 108 is shown and described as receiving signals from the modules 102-106 and providing them to the backplane bus 110, the backplane filter 108 can instead provide signals directly to the various modules 102-106 in some exemplary embodiments.

Whether and what kinds of signals are communicated between the modules 102-106 and the backplane filter 108, between the backplane filter 108 and the bus 110, or between the modules 102-106 and the bus 110, can depend on a communications architecture of the control system 100. Thus, in one example, the backplane communications bus 110 can be an asynchronous bus controlled by the backplane filter 108. In the example, the CPU module 102 can transmit address and data strobe signals to the backplane filter 108. Responsive to receiving the address strobe signal from the CPU module 102, the backplane filter 108 can read a port of address pins (set by the CPU module 102) to determine an address to which the CPU module 102 intends to communicate over the bus 110. Responsive to receiving the data strobe signal, the backplane filter 108 can read a port of data pins (set by the CPU module 102) to determine a data value that the CPU module 102 intends to communicate to a previously-addressed module. Upon determining that an address or a data value are permissible communications for the system 100, the backplane filter 108 can transmit the appropriate address strobe or data strobe signal to the bus 110. In the example, the modules 102-106 are all connected to the backplane bus 110. Thus, when the backplane filter 108 transmits the address strobe or the data strobe, all or a subset of the IO modules 104-106 receives the address strobe or the data strobe and reads a value on the port of address pins or a value on the port of data pins, respectively.

In another example, the modules 102-106 communicate by transmitting data over output lines, and receiving data on input lines. In this example, the output lines of the modules 102-106 can be connected to the backplane filter 108 at the filter's input lines, whereas the output lines of the filter 108 are connected to the bus 110. The input lines of the modules 102-106 can then be connected to the communications bus 110. In still another example, the CPU module 102 and the IO modules 102-106 can communicate exclusively via the backplane filter 108, rather than through the bus 110. Thus, a first module in the modules 102-106 can provide a signal to the backplane filter 108 by way of a shared input/output communications line of the first module in the modules 102-106, the signal being intended for communication to a second module in the modules 102-106. The backplane filter 108 can then transmit the signal directly to the second module by way of a shared input/output communications line of the second module. It is to be understood that any of these methods of communication of data among the modules 102-106, the backplane filter 108, and the communications bus 110 are applicable to the system failure and cyber-attack mitigation operations of the backplane filter 108 described herein.

Embodiments of the present disclosure are applicable to various control systems such as, for example, programmable logic controllers (PLCs), control systems incorporating the VME bus standard, etc. In an exemplary embodiment, the modules 102-106 can be modules capable of insertion or removal from a PLC rack. In other exemplary embodiments, the modules 102-106 can be components permanently attached to a printed circuit board comprising the modules 102-106 and the backplane filter 108.

Figure 2:
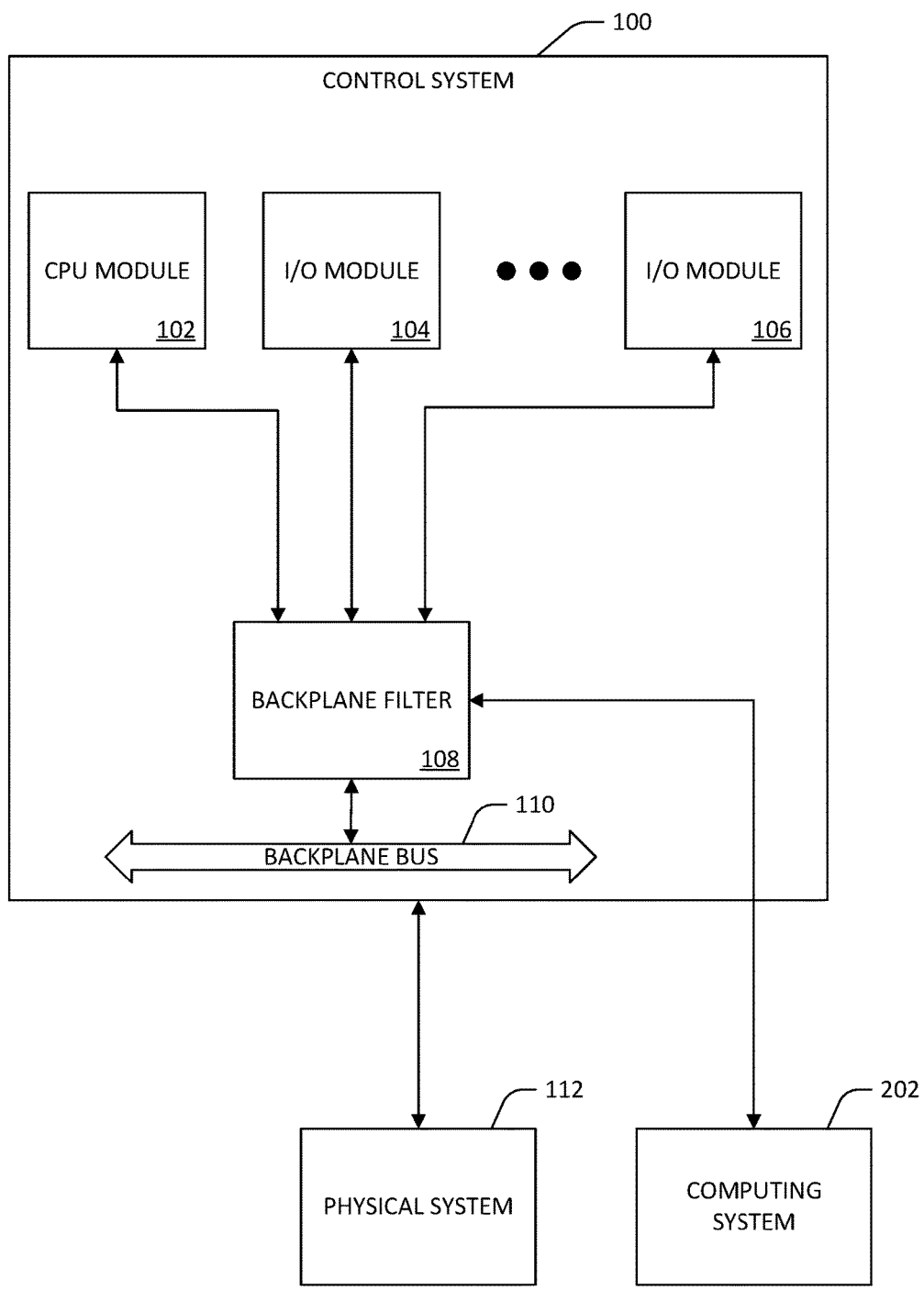
FIG. 2 is a functional block diagram of an exemplary system for mitigating cyber-attacks against control systems using machine-learning techniques.

The backplane filter 108 comprises a hardware logic device such as a field-programmable gate array (FPGA) or a processor, wherein the hardware logic device is configured to perform active attack-mitigation operations described herein. Furthermore, while certain functionality is described herein as being performed by the backplane filter 108, in some embodiments the backplane filter 108 can perform various operations in conjunction with other systems. For example, referring now to FIG. 2, the backplane filter 108 can communicate with a computing system 202, and a portion of the acts described herein as being performed by the backplane filter 108 can instead be performed by the computing system 202. By way of example, the computing system 202 can receive information from the backplane filter 108 pertaining to historic states of the system 100, and can construct state-machine models of the system 100 or generate machine-learning data pertaining to expected states of the system 100. By way of another example, the computing system 202 can receive data from the backplane filter 108 pertaining to communications between modules 102-106 of the system 100, and the computing system 202 can execute machine-learning algorithms over the communications to identify various features and patterns in the communications data. The computing system 202 can then transmit updated rules data that allows the backplane filter 108 to make its determinations over whether to block or pass received signals based upon the features and patterns identified by the computing system 202.

The control system 100 interacts with a physical system 112 to control various processes or parameters of the physical system 112. The physical system 112 can be substantially any system of machinery, devices, or other physical things that can be controlled by way of electrical control inputs from the control system 100. For example, the physical system 112 can be or comprise the machinery of an assembly line in a manufacturing plant, various machinery deployed in a power generating station that is used to operate the station, machinery and devices on maritime vessels, etc. The control system 100 provides electrical control signals to components of the physical system 112 by way of the IO modules 104-106. These electrical control signals in turn determine the operation of the components of the physical system 112. Subversion of control systems therefore amounts to subversion of the physical systems that are subject to the control of the control systems.

Details of operation of the backplane filter 108 are now described. The backplane filter 108 provides active mitigation of cyber-attacks and other threats to control systems. The backplane filter 108 receives various signals from the modules 102-106 of the control system 100. The signals received from the modules 102-106 are signals that, in conventional control system configurations, would be passed to other modules either directly or through a backplane bus. In the control system 100, these signals are first received by the backplane filter 108 so that the filter 108 can analyze communications between modules. The backplane filter 108 analyzes the received signals and compares them to a set of rules defining desired operating conditions for the control system 100. Based upon a comparison of the signals received by the filter 108 to the set of rules governing permissible communications, the filter 108 makes a determination that the signals are either permissible or impermissible communications for the system 100. Permissible communications are output to the bus 110 by the filter 108 whereas impermissible communications are blocked by the filter 108 (i.e., not output to the bus 110 by the filter 108).

In one exemplary embodiment, the backplane filter 108 can filter communications between modules in the modules 102-106 based upon a whitelist of approved commands for the system. The whitelist can include a list of permitted commands that can be issued by or to each of the modules 102-106. In another example, the backplane filter 108 comprises a state machine model of control logic of the CPU module 102 of the control system. The state machine model comprises a history of past states of the control system 100, and provides a representation of expected normal operating behavior for the control system 100. The backplane filter 108 can identify a system state that would be caused by passing the received signal to the communications bus 110, and can compare the identified state to the state machine model. The backplane filter 108 can determine that the received signal is an impermissible communication for the control system 100 based upon identifying a divergence between the identified state and the state machine model.

The backplane filter 108 can further use machine-learning techniques to identify signals causing abnormal behavior of the system 100. For example, sophisticated attacks might not attempt to inject unallowable commands (e.g., commands not appearing on a whitelist of approved commands), but might instead attempt to issue allowable commands in unintended sequences. An unintended sequence of otherwise permissible acts may present a risk of damage to the physical system 112 or otherwise put the physical system 112 in an unintended or undesirable state. The backplane filter 108 can be configured to use machine-learning data to identify whether a received signal that is otherwise a permissible communication for the control system 100 may be part of an unintended sequence of actions that can put the physical system 112 in an undesired state. Responsive to identifying that the signal is configured to cause the control system 100 to perform an unintended or damaging sequence of actions, the backplane filter 108 can prevent the signal from being passed to the communications bus 110.

Specific communications that can be filtered by the backplane filter 108 can vary from control system to control system, depending upon differences in the physical systems being controlled and differences in the control logic executed by the control systems' respective CPU modules. Additionally, certain general categories of communications between modules 102-106 may be undesirable across a range of different control systems. The backplane filter 108 can be configured to block these categories of communications. For example, in some control system configurations IO modules do not communicate directly with one another. Rather, in these configurations all communication occurs between IO modules and a CPU module that implements the control logic for the control system. For such configurations of the control system 100, the backplane filter 108 can be configured to block signals that are transmitted from one of the IO modules 104-106 and that are intended to be transmitted to another of the IO modules 104-106, since these signals do not conform with normal operation parameters of the control system 100. In other embodiments, the backplane filter 108 can be configured to block communications pertaining to certain system operations that pose a greatest risk of harm to the system. For example, the backplane filter 108 can block specific commands such as firmware updates. In another example, the filter 108 can block commands configured to cause the CPU module 102 to change set points or alarm values associated with sensors or other devices in the physical system 112.

Other exemplary categories of communication that can be blocked by the backplane filter 108 include communications to or from a module having an unknown address. In embodiments in which the backplane filter 108 manages all communication in the control system 100 through point-to-point connection with the various modules 102-106, the backplane filter can determine that a communication originated from an unknown address whenever a communication is received on an input line not associated with a known module. The backplane filter 108 can further maintain a whitelist of approved module addresses. Upon receiving a communication from one of the modules 102-106, the backplane filter 108 can identify an address of an intended recipient module for the received communication. In an example, the address of the intended recipient module can be identified based upon an address header included with the received communication. If the received communication is addressed to an address on the whitelist, the backplane filter 108 can pass the communication to the backplane bus 110. On the other hand, if the communication is addressed to an address that is not on the whitelist, then the filter 108 can prevent the communication from being directed to the bus 110. In another example, the backplane filter 108 can implement a Bloom filter scheme for detecting new addresses. The backplane filter 108 can pass communications to modules not yet having addresses on the whitelist, provided that the filter 108 can authenticate new addresses and distinguish between communications to new authorized modules and communications to unauthorized modules.

In yet another example, the backplane filter 108 can filter communications that direct the control system 100 to cause the physical system 112 to operate outside of safe operating bounds. In the example, the backplane filter 108 can receive a communication from the CPU module 102, wherein the received communication comprises data or a command configured to cause one of the IO modules 104-106 to output a control signal to the physical system 112. The backplane filter 108 analyzes the received communication, and can identify that the communication is configured to cause one of the IO modules 104-106 to output a control signal that will cause the physical system 112 to operate outside of safe operating bounds. In an illustrative example, the physical system 112 can include a heating system that is controlled by the IO module 104. The backplane filter 108 can receive a communication from the CPU module 102 that is configured to cause the IO module 104 to output a control signal that will cause the heating system to operate at a temperature outside of safe operating conditions. The backplane filter 108 can identify that the received communication is configured to cause the IO module 104 to output the control signal, and can identify, based upon one or more rules defining safe operating conditions of the physical system 112 (e.g., a rule for a maximum operating temperature of the heating system), that the control signal would cause the physical system 112 to operate outside said conditions. Upon determining that the received communication is configured to cause the physical system 112 to operate outside of its safe operating conditions, the backplane filter 108 can prevent the communication from being output to the backplane communications bus 110 (e.g., by failing to pass the communication to the bus 110). The rules defining the safe operating conditions of the physical system 112 can include set points and alarm limits for various control parameters of the physical system 112.

Similarly, the backplane filter 108 can be configured to block communications including data indicative of physically impossible values, as such communications can indicate that an attacker is attempting to inject data onto the communications bus 110. By way of example, the backplane filter 108 can receive data that pertains to a sensor of the physical system 112 from one of the IO modules 104-106. The backplane filter 108 can compare the data to a set of rules that define physically possible states for various parameters, devices, components, etc. in the physical system 112. If the data received by the backplane filter 108 from an IO module indicates a value outside the possible states defined by the rules for the physical system 112 (e.g., if data relating to a temperature sensor indicates that the sensor has measured a value below absolute zero), then the backplane filter 108 can prevent the data from being output to the bus 110, and potentially isolate the 10 module from the bus 110.

In embodiments in which the backplane filter 108 controls operations of the backplane communications bus 110, the backplane filter 108 can be configured to return the bus 110 to a normal operating state. In other words, the backplane filter 108 terminates bus cycles such that the bus 110 is never put into an undefined state, or left "hanging". Furthermore, after blocking traffic on the communications bus 110, the backplane filter 108 can be configured to determine whether the control system 100 has been compromised to an extent that it cannot continue to safely operate in its current state. The backplane filter 108 can evaluate an extent to which the control system 100 is compromised based upon predefined conditions. The backplane filter 108 can then take various actions based upon the extent to which the control system 100 is compromised. For example, if one of the IO modules 104-106 intermittently sends malicious communications (i.e., communications that are not permissible for the system 100 according to the filter's 108 ruleset for allowable operations) to the backplane filter 108, the filter 108 can simply block the intermittent malicious communications from the bus 110. If malicious or other communications from one of the IO modules 104-106 become frequent to a point where there is risk of disruption of normal operation of the system 100, the filter 108 can isolate the 10 module in question from the communications bus 110. The backplane filter 108 can therefore protect the system from denial-of-service (DoS) attacks, since an attack that causes a module to attempt communication to the point of being disruptive to the system will cause the backplane filter 108 to isolate the offending module from communication over the bus 110.

When the backplane filter 108 determines that malicious commands are originating from the control system's CPU module 102, it is generally not desirable to simply isolate the CPU module 102 from the bus, since doing so ordinarily causes a complete halt to the functioning of the control system 100. Rather, the backplane filter 108 can be configured to perform all or a subset of the functions of the CPU module 102, and can serve as a substitute for the CPU module 102 for a period of time during which the CPU module 102 is isolated from the bus 110. Thus, the backplane filter 108 can maintain at least partial operation of the control system 100 until the compromised CPU module 102 can be replaced or repaired. In order to perform functions of the CPU module 102, the backplane filter 108 can be configured to execute a model of the CPU module 102's operation. The model executed by the backplane filter 108 can be based upon a copy of the control logic executed by the CPU module 102, or upon a state-machine model of the performance of the CPU module 102, or other logic modeling techniques. The backplane filter 108 can further cause an indication that the CPU module 102 has been compromised to be output so that an operator of the control system 100 can know to replace or repair the CPU module 102. For example, the backplane filter 108 can output a communication to the communications bus 110 that causes one of the modules of the control system 102-106 to indicate a CPU error (e.g., that causes one of the IO modules 104-106 to turn on a light or other indicator that indicates an error condition for the system 100).

Modeling operation of the CPU module 102 by the backplane filter 108 can also provide protection of the control system 100 through diversity and redundancy. In an example, the backplane filter 108 can execute a single model of the functioning of the CPU module 102. The backplane filter 108 can then detect abnormal behavior of the CPU module 102 if behavior of the CPU module 102 and behavior of the model executed by the filter 108 diverge. The backplane filter 108 can further execute several diverse models of the CPU module 102. The backplane filter 108 can then use a voting scheme among the models to detect anomalous behavior of the CPU module 102. Such a scheme can increase effort required by an attacker to subvert the control system 100. By way of illustration, if the backplane filter 108 implements a 3-to-1 voter, defeating the voter requires an attacker to modify the behavior of either the CPU module 102 and one of the filter's models, or both of the filter's models. Since the models are diverse (i.e., not identical), different attacks may be necessary in order to subvert more than one of the models. In order to successfully attack the system 100, therefore, an attacker must not only subvert the CPU module 102 according to one method, but must also subvert a model of the CPU module 102 executing on the backplane filter 108 according to another method, thereby increasing the effort required to successfully execute an attack on the system 100.

Figure 3:
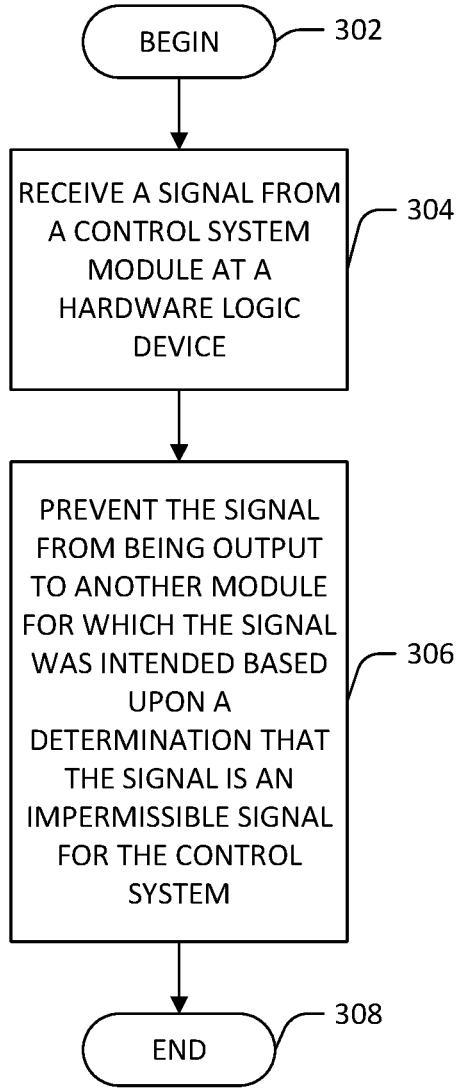
FIG. 3 is flow diagram that illustrates an exemplary methodology for active mitigation of cyber-attacks against control systems.

FIG. 3 illustrates an exemplary methodology relating to active mitigation of cyber-attacks against control systems.

While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 3, a methodology 300 that facilitates active mitigation of cyber-attacks against control systems is illustrated. The methodology 300 begins at 302, and at 304 a signal is received at a hardware logic device (such as an FPGA, processor, ASIC, etc.) from a control system module. All communications initiated between modules in the control system can pass through the hardware logic device, which determines whether or not to pass on the signals to their intended destination (i.e., an intended recipient module of the control system). At 306, the signal received at 304 is prevented from being output to its intended recipient module by the hardware logic device in response to determining that the signal is an impermissible signal for the control system, whereupon the methodology 300 ends at 308.

Figure 4:
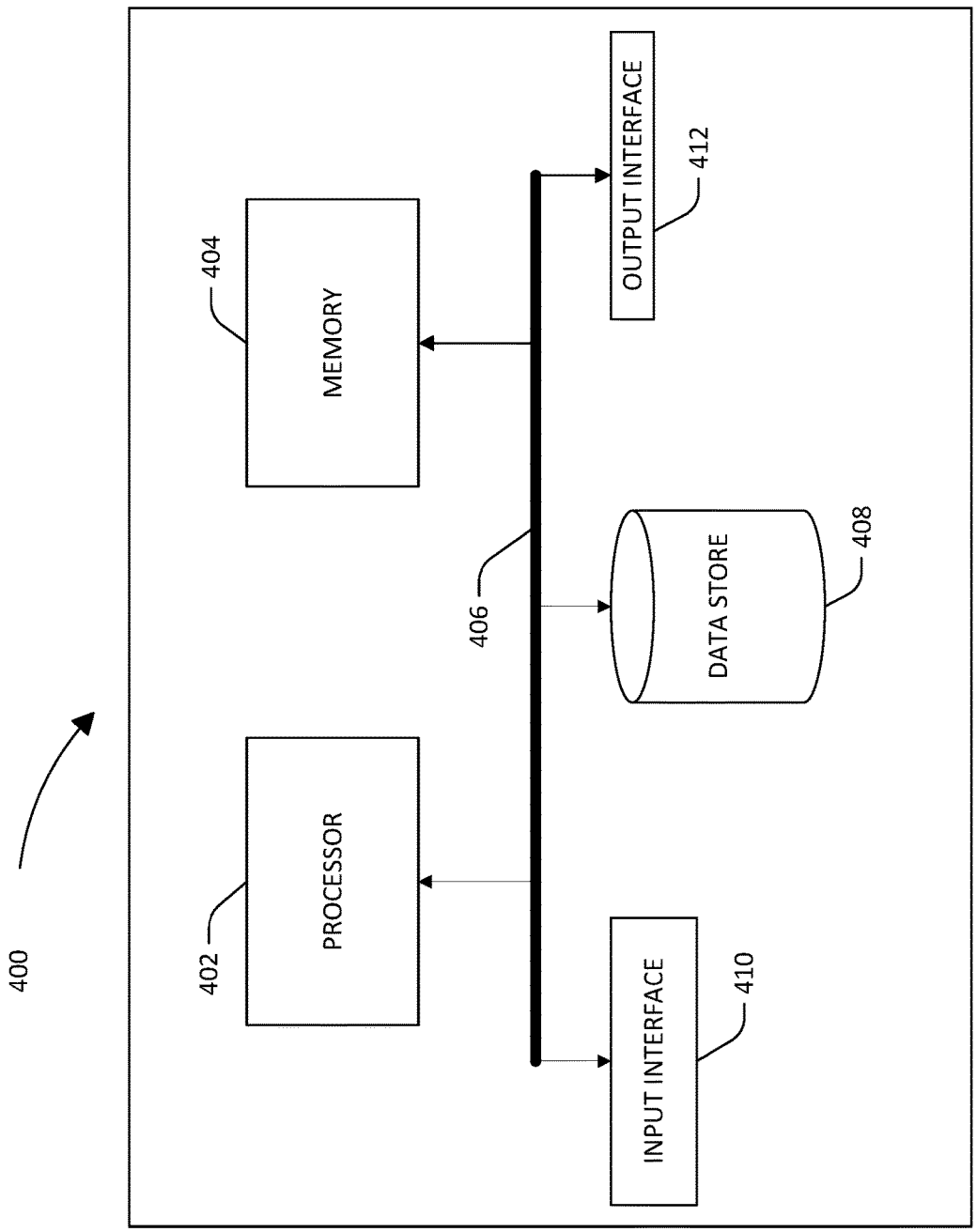
FIG. 4 is an exemplary computing system.

Referring now to FIG. 4, a high-level illustration of an exemplary computing device 400 that can be used in accordance with the systems and methodologies disclosed herein is illustrated. For instance, the computing device 400 may be used in a system that executes machine-learning algorithms over communications data received from a backplane filter of a control system. By way of another example, the computing device 400 can be used to communicate with and configure control logic for a control system backplane filter. The computing device 400 includes at least one processor 402 that executes instructions that are stored in a memory 404. The instructions may be, for instance, instructions for implementing functionality described as being carried out by one or more components discussed above or instructions for implementing one or more of the methods described above. The processor 402 may access the memory 404 by way of a system bus 406. In addition to storing executable instructions, the memory 404 may also store communications data received at the computing device 400 from a backplane filter or machine-learning data generated based upon data received from the backplane filter.

The computing device 400 additionally includes a data store 408 that is accessible by the processor 402 by way of the system bus 406. The data store 408 may include executable instructions, backplane filter communications data, machine-learning data, etc. The computing device 400 also includes an input interface 410 that allows external devices to communicate with the computing device 400. For instance, the input interface 410 may be used to receive instructions or other data from an external computer device, from a user, etc. The computing device 400 also includes an output interface 412 that interfaces the computing device 400 with one or more external devices. For example, the computing device 400 may display text, images, etc. by way of the output interface 412. In another example, the computing device 400 can interface with a backplane filter of a control system by way of the output interface 412.

It is contemplated that the external devices that communicate with the computing device 400 via the input interface 410 and the output interface 412 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 400 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 400 may be a distributed system. Thus, for instance, several devices may be in communication by way of a network connection and may collectively perform tasks described as being performed by the computing device 400.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include FPGAs, application-specific Integrated Circuits (ASICs), application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A control system, comprising:
    a processing module;
    a plurality of input/output (IO) modules;
    a backplane communications bus; and
    a hardware logic component interposed between the backplane communications bus and the processing module such that the hardware logic component is in communication with the processing module and the backplane communications bus of the control system, wherein the hardware logic component receives signals output by the processing module, and wherein the hardware logic component is configured to perform the following acts:
        responsive to receiving a signal from the processing module that is directed to at least one of the IO modules, determining that the signal comprises an impermissible communication for the control system; and
        responsive to determining that the signal comprises an impermissible communication for the control system, executing, at the hardware logic component, a model of control logic of the processing module of the control system such that the hardware logic component performs at least some of the functionality of the processing module of the control system.

2. The system of claim 1, wherein the control system comprises a VME control system.

3. The system of claim 1, wherein the control system comprises a programmable logic controller (PLC).

4. The system of claim 1, wherein determining that the signal comprises an impermissible communication for the control system comprises determining that the signal does not satisfy a whitelist of approved system commands.

5. The system of claim 1, wherein determining that the signal comprises an impermissible communication for the control system is based at least in part upon the model of the control logic of the processing module.

6. The system of claim 1, wherein determining that the signal comprises an impermissible communication for the control system is based at least in part upon machine-learning data.

7. The control system of claim 1, the acts further comprising:
    responsive to receiving a second signal from the processing module that is directed to the at least one IO module, determining that the second signal comprises a permissible communication for the control system; and
    responsive to determining that the second signal comprises a permissible communication for the control system, outputting the second signal to the at least one IO module by way of the backplane communications bus.

8. A method, comprising:
    receiving a signal from a processing module of a control system at a hardware logic device, the hardware logic device connected between the processing module of the control system and a backplane communications bus of the control system such that signals output by the processing module of the control system are received at the hardware logic device, the signal configured by the processing module to be provided to at least one other module of the control system;
    preventing the signal from being output to the at least one other module by way of the backplane communications bus based upon determining that the signal is an impermissible signal for the control system; and
    responsive to determining that the signal is an impermissible signal for the control system, executing, at the hardware logic device, a model of control logic of the processing module of the control system such that the hardware logic device performs at least some of the functionality of the processing module of the control system.

9. The method of claim 8, further comprising:
    receiving a second signal at the hardware logic device;
    determining that the second signal is an impermissible signal for the control system based upon determining that the second signal originated from an input/output (IO) module of the control system and was configured by the IO module to be provided to at least one other IO module of the control system; and
    preventing the second signal from being output to the at least one other IO module by way of the backplane communications bus based upon determining that the second signal is an impermissible signal for the control system.

10. The method of claim 8, further comprising:
    receiving a second signal at the hardware logic device;
    determining that the second signal is an impermissible signal for the control system based upon determining that the signal originated from an invalid module address; and
    preventing the second signal from being output to the backplane communications bus based upon determining that the second signal is an impermissible signal for the control system.

11. The method of claim 8, wherein determining that the signal is an impermissible signal for the control system comprises determining that the signal is directed to an invalid module address.

12. The method of claim 8, wherein determining that the signal is an impermissible signal for the control system comprises determining that the signal comprises data configured to cause a set point or alarm value of a physical system controlled by the control system to exceed safe operating bounds.

13. The method of claim 8, further comprising constructing a first state machine model of the control logic of the processing module of the control system based upon a history of previous states of the control system, wherein determining that the signal is an impermissible signal for the control system is based at least in part upon the first state machine model.

14. The method of claim 13, wherein determining that the signal is an impermissible signal for the control system comprises determining that the signal diverges from the first state machine model of the control logic of the processing module.

15. The method of claim 13, further comprising constructing a second state machine model of the control logic of the processing module of the control system based upon the history of previous state of the control system, wherein determining that the signal is an impermissible signal for the control system is based upon a voting scheme that incorporates the first state machine model and the second state machine model.

16. The method of claim 8, wherein determining that the signal is an impermissible signal for the control system is based at least in part upon machine-learning data.

17. The method of claim 16, wherein the machine-learning data is data generated by execution of machine-learning algorithms over historic state data for the control system.

18. The method of claim 8, further comprising:
responsive to determining that the processing module of the control system has been potentially compromised by a cyber-attack, preventing signals received from the processing module from being output to other modules of the control system.

19. A system comprising:
a control system comprising:
a backplane communications bus; and
a plurality of modules that receive signals from the backplane communications bus; and
a field-programmable gate array (FPGA), the FPGA communicatively coupled between the backplane communications bus and the plurality of modules such that signals output by the plurality of modules are received at the FPGA, wherein the FPGA receives a signal from one of the plurality of modules and outputs the signal to the backplane communications bus based upon determining that the signal is a permissible communication for the control system, and wherein further the FPGA is configured to execute a model of control logic of a processing module of the control system responsive to determining that a signal received from a processing module in the plurality of modules is an impermissible communication for the control system, such that the FPGA performs at least some of the functionality of the processing module of the control system.

20. The system of claim 19, wherein the control system is a programmable logic controller (PLC).

* * * * *